Feb. 25, 1969 R. H. JONES 3,430,230
ANNUNCIATOR CIRCUIT
Filed Oct. 1, 1965
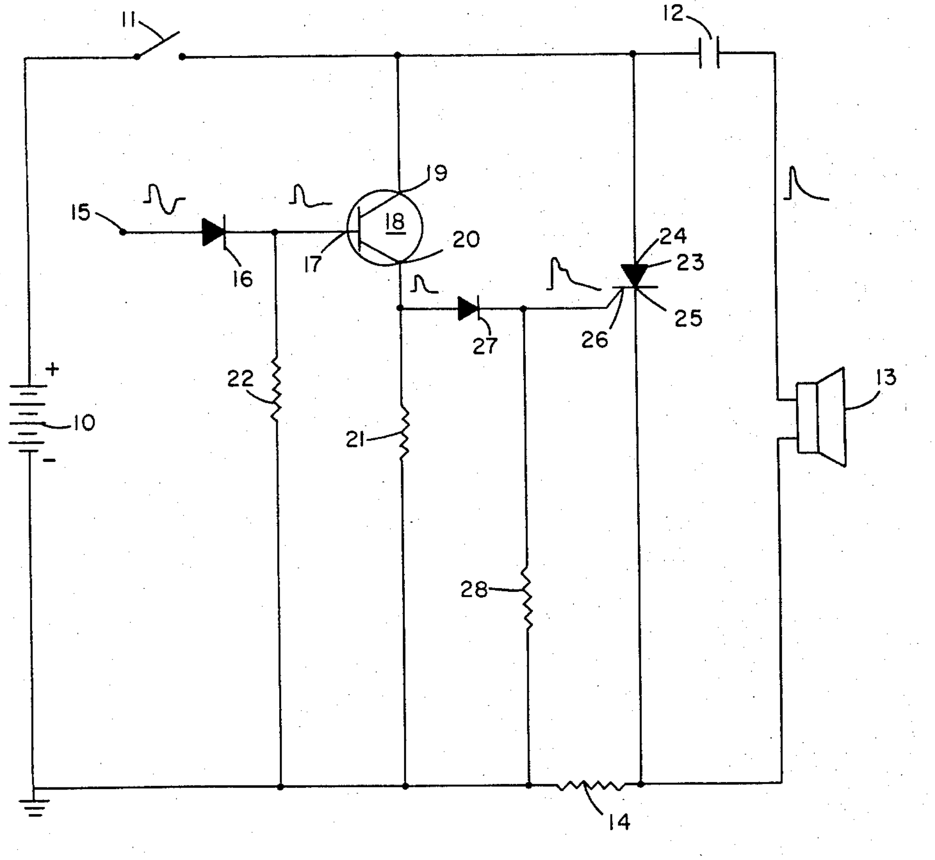
INVENTOR.
ROBERT H. JONES
BY
Roland A. Anderson United States Patent Office 3,430,230

Patented Feb. 25, 1969

3,430,230
ANNUNCIATOR CIRCUIT

Robert H. Jones, Scotia, N.Y., assignor to the United States of America as represented by the United States Atomic Energy Commission Filed Oct. 1, 1965, Ser. No. 492,342
U.S. Cl. 340—384 5 Claims
Int. Cl. G08b *3/00;* H03k *17/00*

ABSTRACT OF THE DISCLOSURE

An annunciator circuit for generating an audio alarm in response to an event represented by an electrical pulse. An SCR is connected across a storage element so as to discharge the accumulated charge on the storage element through a loudspeaker when the SCR is triggered by a signal received from the emitter of a transistor amplifier.

This invention relates to an annunciator circuit for generating an audio alarm in response to an event represented by an electrical pulse. More particularly, this invention relates to a radiation detector circuit which generates an audio alarm in response to a radiation event monitored by a pulse type radiation detector.

When personnel are working with or near radioactive material, such as in proximity with a nuclear reactor, it is important to provide an audible monitoring of radiation detectors when the output meter is inconvenient to observe or when rapid radiation surveying is being done. Under these situations, it is desirable that the audio alarm be reliable, highly sensitive and compact in size. The reliability should be based on long life maintenance free operation.

Conventional annunciator circuits generally have either short reliable operating times due to large quiescent drain on the circuits power source with consequent reduction in operating voltage and sensitivity, require relatively large power sources, frequent recharging cycles or battery or circuit replacement.

It is an object of this invention to provide an annunciator circuit which has long life with high sensitivity.

Further, it is an object of this invention to provide an annunciator circuit which has little quiescent current drain on the circuit power source.

Further, it is an object of this invention to provide an annunciator circuit which utilizes long life miniature components, is compact in size and is highly sensitive and reliable.

With the above objects in mind, the annunciator circuit of this invention utilizes a common collector transistor amplifier biased in such a manner as to have a very low quiescent current drain on the circuit power source including a diode coupling the input signal with the base of the transistor, a silicon controlled rectifier (SCR) connected across a storage element and a loudspeaker so as to discharge the current stored in the storage element through the loudspeaker when the SCR is triggered, means for coupling a storage current to the storage element and means for coupling a triggering signal from the amplifier emitter to the SCR.

An annunciator circuit incorporating this invention is illustrated in the accompanying drawing.

In the annunciator circuit illustrated in the drawing, the power source 10, generally a battery, is connected with its positive terminal through switch 11 to capacitor 12. Capacitor 12 is connected through loudspeaker 13 and limiting resistor 14 to the negative ground terminal of battery 10. Input terminal 15 is coupled through forward biased diode 16 to base 17 of transistor amplifier 18. Collector 19 of transistor 18 is connected directly to the positive terminal of power source 10 through switch 11.

Emitter 20 of transistor 18 is connected to the negative ground terminal of power source 10 through resistor 21 and base 17 of transistor 18 is connected to the negative ground terminal of power source 10 through resistor 22.

Silicon control rectifier 23 is connected in parallel with capacitor 12 and loudspeaker 13 with the anode 24 connected to the positive side capacitor 12 and the cathode 25 connected to the junction of limiting resistor 14 and loudspeaker 13. The output of transistor 18, emitter 20, is coupled to trigger electrode 26 of SCR 23 through the forward biased diode 27. The cathode of diode 27 is returned to ground through resistor 28.

In operation, after switch 11 is closed and capacitor 12 charged, a source of positive pulses is coupled to terminal 15 and the pulse transferred by diode 16 to the base 17 of transistor 18. The positive output pulse at emitter 20 of transistor 18 is applied to the anode of diode 27 which provides a rectified direct current of positive polarity at trigger electrode 26 of SCR 23. The resistors 21 and 28 control the amplitude and current of the pulse for proper operation of this SCR 23. When SCR 23 is triggered by diode 27, the charge on capacitor 12 is switched by SCR 23 through loudspeaker 13. The current supplied by capacitor 12 is of short duration and causes the diaphragm of loudspeaker 13 to move instantly to produce a loud click.

Resistor 14 limits the charging current from the power source 10 capacitor 12 to give it longer operating life and after SCR 23 is triggered, resistor 14 acts to isolate the SCR 23, capacitor 12 and loudspeaker 13 circuit from the charging voltage of power source 10 to remove the voltage from the anode 24 of SCR 23. SCR 23 would normally remain conductive once it is triggered as long as its anode has a positive potential in it, but when the voltages are momentarily interrupted, it then becomes nonconducting until the next gate pulse arrives to repeat the operation.

Suitable components which may be utilized in an annunciator circuit which embodies this invention are as follows:

| Component | | Value |
|---|---|---|
| Transistor 18 | | 2N1304 |
| SCR 23 | | 13A8 |
| Diode 16 | | 1N34 |
| Diode 27 | | 1N34 |
| Battery 10 | volts | 15 |
| Capacitor 12 | mfd | 4 |
| Loudspeaker 13 | ohms | 8 |
| Resistor 21 | do | 10K |
| Resistance 22 | do | 47K |
| Resistor 28 | do | 10K |
| Resistor 14 | do | 4K |

Since the base 17 of transistor 18 is not directly connected to the positive or negative terminals of power source 10, the transistor does not have any collector or emitter current flow except a small leakage current in the order of a few microamperes. This value is insignificant and the only time current flow is needed for operating the circuit is when the positive input signal pulse appears at base 17, causing transistor 18 to conduct for the duration of the input pulse. This current flow, when at its maximum peak, produces an output pulse amplitude of approximately three volts to trigger electrode 26 of SCR 23.

The sensitivity of the circuit, utilizing the suggested components, requires an input pulse of at least .1 volt peak amplitude at a minimum duration time of .3 microsecond. SCR 23 requires a trigger voltage of about .7 volt in order to be triggered. The circuit is thus designed to be sensitive to very small pulses of short duration. Further, the overall quiescent current drain on the power source using the above components is approximately 6 microamperes thus insuring long battery life.

What is claimed is:

1. An annunciator circuit for generating an audio alarm in response to an event represented by an electrical pulse comprising;

(a) biasing means,
(b) a transistor having a base, a collector and an emitter,
(c) means for connecting said transistor to said biasing means in a common collector configuration in a normally nonconducting state,
(d) a storage capacitor,
(e) a loudspeaker connected in series with said capacitor and said biasing means,
(f) a silicon controlled rectifier (SCR) having an anode, a cathode and a trigger electrode, said SCR connected in parallel with said capacitor and said loudspeaker,
(g) means for coupling a pulse to the base of said transistor, and
(h) rectifier means for coupling the output of the emitter of said transistor to the trigger electrode of said SCR so as to discharge said capacitor through said SCR and said loudspeaker.

2. The annunciator circuit described in claim 1 having means connected between said loudspeaker and said cathode of said SCR and said biasing means for limiting the capacitor charging current and for isolating said SCR from said biasing means to deenergize said SCR.

3. The annunciator circuit described in claim 1 wherein said pulse coupling means is a diode.

4. The annunciator circuit described in claim 1 wherein said rectifier means is a diode.

5. An annunciator circuit for generating an audio alarm in response to an event represented by an electrical pulse comprising;

(a) a power supply having a first and second terminal,
(b) a transistor having a base, a collector connected to the first terminal of said power supply, and an emitter,
(c) means for coupling the emitter of said transistor to the second terminal of said power supply,
(d) a storage capacitor connected to the first terminal of said power supply,
(e) a loudspeaker connected between said capacitor and the second terminal of said power supply,
(f) a silicon controlled rectifier (SCR) having an anode, a cathode and a trigger electrode, said SCR anode and cathode connected across said capacitor and said loudspeaker,
(g) means for coupling a pulse to the base of said transistor, and
(h) rectifier means for coupling the emitter of said transistor to the trigger electrode of said SCR so as to discharge said capacitor through said SCR and said loudspeaker.

References Cited

UNITED STATES PATENTS

| | | | |
|---|---|---|---|
| 3,204,183 | 8/1965 | Hasenzahl. | |
| 3,283,154 | 11/1966 | Giuffrida | 340—228 |
| 3,284,791 | 11/1966 | Voigt. | |

THOMAS B. HABECKER, *Primary Examiner.*

U.S. Cl. X.R.

307—246